UNITED STATES PATENT OFFICE.

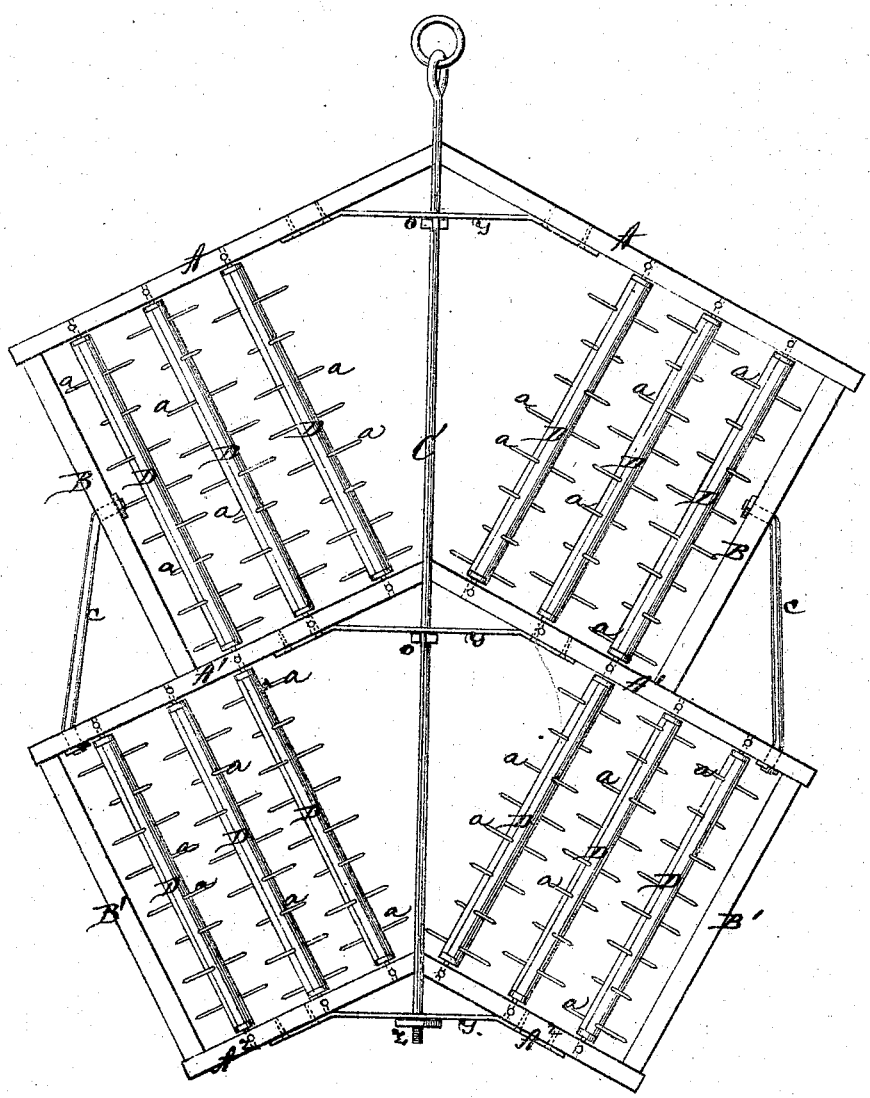

JOHN BENSON, OF BELLE PLAINS, IOWA.

IMPROVEMENT IN HARROWS.

Specification forming part of Letters Patent No. 117,595, dated August 1, 1871; antedated July 28, 1871.

*To all whom it may concern:*

Be it known that I, JOHN BENSON, of Belle Plains, in the county of Benton and State of Iowa, have invented a new and valuable Improvement in Harrows; and I do hereby declare that the following is a full, clear, and exact description of the construction and operation of the same, reference being had to the annexed drawing making a part of this specification, and to the letters and figures of reference marked thereon.

The drawing is a representation of my harrow in plan view.

The nature of my invention consists in the construction and arrangement of a complex revolving harrow, as will be more fully set forth.

The frame of my harrow is constructed in the following manner: Two beams, A A, are connected together at a suitable angle of less than ninety degrees, said beams being five feet in length, and their other ends connected, by bars B B four feet in length, with two other beams $A^1 A^1$, of exactly the same shape and size as the beams A A. The point where the bars B B connect with the beams $A^1$ should be three feet from the center or angle. The beams $A^1$ are in their turn connected by similar bars, B′, with beams $A^2$, of the same general construction as the beams A $A^1$, but only three feet in length, thus making the bars B′ connect the ends of the beams $A^1$ and $A^2$. Through the three angles thus formed passes the draft-rod C, which may be so arranged that the team may be attached to either end of the same. On each side of the draft-rod, in the frame, are mounted six rollers, D D, in the manner shown in the drawing, said rollers being provided with teeth $a\ a$, set in spiral or screw form. This form, with the position of the rollers, causes them to roll whenever anything obstructs the tooth, leaving the obstruction on the ground and doing its work complete. The beams B of the front section of the frame are united with the beams $A^1$ of the rear section by means of strong iron rods that serve as braces, adapted for tightening or loosening by suitable nut-and-screw connections, as shown on the drawing. These braces are respectively marked $c$ in the drawing. The letters Y represent cross-bars, respectively, united with the frame-bars, as shown, and through which the draw-bar C is passed. In the rear of these cross-bars, respectively, and upon the draw-bar, I affix a nut and screw, as shown at Z, or I arrange a toggle-pin through said bar, as shown at $a$, in order to equalize the draft upon the frame so far as practicable. I prefer the use of the nut and screw-thread to the toggle-pin, inasmuch as it enables the operator to keep the draft more evenly distributed than is possible by the pins only.

Having thus fully described my invention, what I claim as new, and desire to secure by Letters Patent, is—

The harrow-frame herein described, having beams A, $A^1$, and $A^2$, bars B and B′, braces $c$, draw-bar C, cross-bars Y, and nuts and screw-threads Z, constructed and arranged substantially as and for the purpose specified.

In testimony that I claim the above I have hereunto subscribed my name in the presence of two witnesses.

JOHN BENSON.

Witnesses:
   A. N. F. BELL,
   J. G. BENSON.